US012334077B1

(12) United States Patent
Iyer et al.

(10) Patent No.: US 12,334,077 B1
(45) Date of Patent: Jun. 17, 2025

(54) ROBUST METHODS FOR AUTOMATED AUDIO SIGNAL TO TEXT SIGNAL PROCESSING SYSTEMS

(71) Applicant: ExlService Holdings, Inc., New York, NY (US)

(72) Inventors: Gaurav Iyer, Delhi (IN); Kaushal Agarwal, Pune (IN); Shuvadib Paul, Kolkata (IN); Sandeep Bhutani, Kurukshetra (IN); Ankush Jain, Delhi (IN); Abdulrehman Sayyad, Pune (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 18/961,316

(22) Filed: Nov. 26, 2024

(51) Int. Cl.
| | |
|---|---|
| *G10L 15/18* | (2013.01) |
| *G06F 9/451* | (2018.01) |
| *G10L 15/01* | (2013.01) |
| *G10L 15/22* | (2006.01) |
| *G10L 15/26* | (2006.01) |
| *H04L 67/306* | (2022.01) |

(52) U.S. Cl.
CPC .............. *G10L 15/26* (2013.01); *G06F 9/451* (2018.02); *G10L 15/01* (2013.01); *H04L 67/306* (2013.01)

(58) Field of Classification Search
CPC .......... G10L 15/18; G10L 15/22; G06N 20/00
See application file for complete search history.

(56) References Cited

U.S. PATENT DOCUMENTS

| | | | | |
|---|---|---|---|---|
| 2018/0091654 | A1* | 3/2018 | Miller | H04M 3/42221 |
| 2018/0115643 | A1* | 4/2018 | Skiba | H04M 3/5175 |
| 2019/0058793 | A1* | 2/2019 | Konig | G06F 40/30 |
| 2019/0347326 | A1* | 11/2019 | Kozhaya | G06F 40/30 |
| 2020/0387673 | A1* | 12/2020 | Beaver | G06Q 50/00 |
| 2022/0244925 | A1* | 8/2022 | Moss | G10L 15/183 |
| 2023/0154453 | A1* | 5/2023 | Erdenee | G06N 3/006 |
| | | | | 704/231 |

* cited by examiner

*Primary Examiner* — Jialong He
(74) *Attorney, Agent, or Firm* — Perkins Coie LLP

(57) ABSTRACT

Systems and methods are disclosed comprising techniques for signal processing, such as determining domain groups for portions of a signal and applying domain-specific signal quality control rules to various portions of a signal. The techniques can include receiving audio signal data corresponding to a recorded interaction, converting the audio signal data into a transcript that includes alphanumeric components, prompting a generative machine learning model to generate a response that maps at least one alphanumeric component of the converted transcript to a target signal domain group, prompting a generative machine learning model to generate a response that includes a set of alphanumeric elements from the at least one alphanumeric component that satisfy the at least one signal extraction rule of the target signal domain group, and generating a computer-based prediction for a set of attributes for the at least one alphanumeric component.

20 Claims, 8 Drawing Sheets

Evaluation Interface

Interaction Timeline | Performance Report — 204

MENU
- Dashboard
- Evaluation
- Monitoring
- Alerts

OPENING STATEMENTS — 230

| No. | Evaluation Criterion 231 | Signal Performance Score 232 | Confidence Score 233 | Certification Category 234 | Associated Transcript and Audio 235 |
|---|---|---|---|---|---|
| 1 | Did the provider present a friendly, amicable greeting? | 1 | 100 | PASS | 00:00:15 – 00:00:26<br>Thank you for coming in fully verified from the automated system. How may I help? |
| 2 | Did the provider inform subscriber of days since prior incident? | 1 | 90 | PASS | your service record here. Is this in reference to the incident previously reported 20 days ago? |

PROBLEM-SOLVING — 236

| No. | Evaluation Criterion 231 | Signal Performance Scores 232 | Confidence Score 233 | Certification Category 234 | Associated Transcript and Audio 235 |
|---|---|---|---|---|---|
| 1 | Did the provider ask appropriate probing questions and offer rebuttals? | 0 | 100 | FAIL | 00:00:00 – 00:00:00<br>N/A |

( UPDATE )

*FIG. 2B*

ROBUST METHODS FOR AUTOMATED AUDIO SIGNAL TO TEXT SIGNAL PROCESSING SYSTEMS

BACKGROUND

In the field of audio signal processing, the transcription of audio content involves converting spoken words into written text. This process typically utilizes various techniques such as speech recognition, natural language processing, and machine learning algorithms to accurately transcribe the spoken content into written form. Audio signals are first pre-processed to remove noise and enhance the quality of the signal. Then, the processed audio is analyzed using advanced algorithms to identify and transcribe individual words and phrases. The transcription process in audio signal processing can play an important role in applications such as automated closed captioning, voice-controlled systems, and audio content indexing for search and retrieval. However, conventional processes may have several deficiencies. One common issue is the accuracy of transcription, especially in cases of poor audio quality, overlapping speech, or non-standard accents. Another deficiency is the lack of context understanding, as the transcription may not accurately capture the nuances, emotions, or specific jargon used in the conversation. There exists a need to address these deficiencies to ensure more reliable and effective signal processing and signal audit processes.

BRIEF DESCRIPTION OF THE DRAWINGS

Detailed descriptions of implementations of the present invention will be described and explained through the use of the accompanying drawings.

FIGS. 2A-C show an example graphical user interface that demonstrates aspects of a signal evaluation interface of the signal processing system in accordance with some implementations of the present technology.

Figure 1:
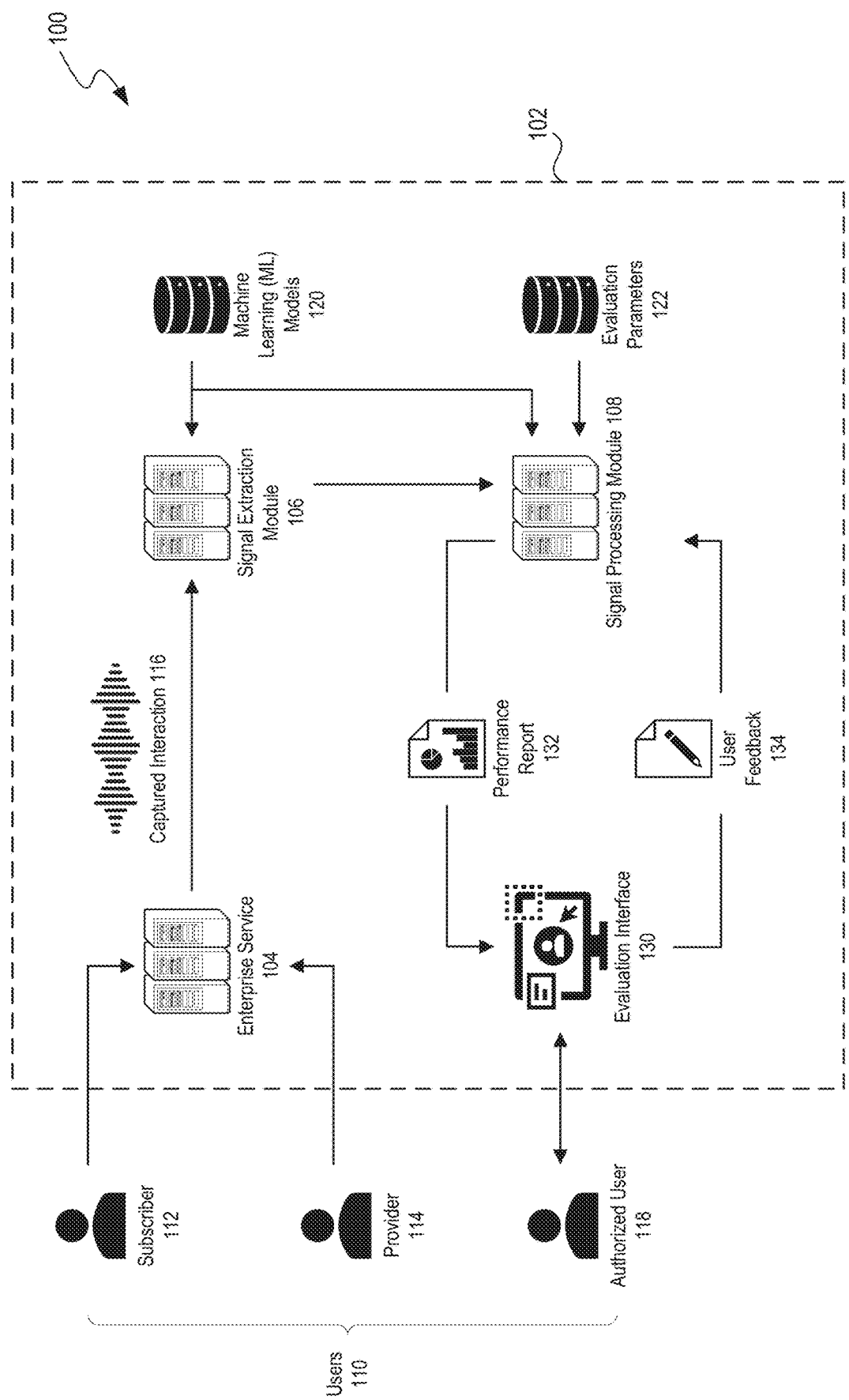
FIG. 1 shows an example computing environment that includes a signal processing system in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing systems, such as computer-based customer service systems, typically rely on a performance evaluation process to implement quality control of audio signal data of a captured interaction (e.g., a recorded conversation) involving participant users of an enterprise service (e.g., a subscribing user, an authorized service provider, and/or the like). Common quality control processes rely on manual evaluation processes (e.g., performed by a human analyst) that measure compliance of the captured audio signal data to a set of performance guidelines. For example, a user can listen to a recorded conversation, label the start and end points of various segments in a conversation, and apply performance evaluation criteria to the segments.

Reviewing and evaluating audio signal data of captured interactions is a time-intensive process that often requires several hours, or days, to complete. Accordingly, existing systems are typically slow and inefficient at addressing time constrained tasks for maintaining performance sensitive enterprise systems. To further compound this issue, performance assessments often rely on evaluating the audio signal data of captured interactions with respect to unique and complex combinations of signal criteria (e.g., signal processing thresholds, sentiment analysis criteria, and/or the like) that naturally require additional time for analysis and remediation.

Additionally, manual review of conversations typically occurs after a conversation takes place, which significantly diminishes utility of quality control techniques to remedy any issues in real-time. For example, a conversation may involve a customer seemingly calling to record a problem with an appliance, when the customer's unstated objective is to schedule a service appointment. Existing customer support systems, such as robotic/automated agents in customer support systems, are not able to detect customer sentiment and various unstated assumptions, which significantly diminishes utility of these systems.

In other aspects, conventional systems include automated workflows (e.g., via executable software programs) that perform quality control processes for evaluating captured audio signal data without manual intervention (e.g., an external user). For example, existing systems often rely on heuristic outputs (e.g., comparison to predetermined threshold values) or direct predictions of statistical inference models (e.g., machine learning algorithms, natural language processing, and/or the like) to approximate performance metrics for evaluating quality of the captured audio signal data. However, without additional oversight processes to validate these automated quality control assessments, this approach often generates performance evaluations that include erroneous information or misrepresentative characterization of the captured audio signal data. As a result, these and other problems associated with inefficient review and performance evaluation of audio signal data for captured interactions of enterprise services can significantly diminish the overall user experience, place undue burden on maintenance support teams, negatively impact service providers and third-party services, and so forth.

Disclosed herein are a system and related methods for processing and evaluating performance metrics (e.g., adherence to service guidelines) for captured interactions (e.g., recorded conversations) of an enterprise service. The disclosed system can analyze transformed signal data (e.g., alphanumeric transcripts generated from audio signal data) associated with participant users (e.g., a subscriber, an authorized service provider) of the enterprise service to predict performance indicators (e.g., sentiment attributes) for the captured interaction. By automatically comparing the predicted performance indicators to dynamic signal evaluation criteria, the disclosed system reduces user input in determining evaluation metrics for the captured interaction. Further, the disclosed system can generate and transmit performance evaluations of the captured interaction in real-time (e.g., via continuous audio stream data), enabling reactive correction and/or remediation of ongoing interactions between the participant users.

The disclosed system can generate, and display, custom user interfaces that enable an authorized user to modify the evaluation results (e.g., signal performance score, sentiment analysis, and/or the like) for the audio signal data of the captured interaction. For example, the system can present performance metrics for the audio signal data at user interactable components (e.g., selectable interface widgets) in a streamlined arrangement that enables users to easily adjust portions of the evaluation results. As a result, the system enables external users (e.g., authorized maintenance users) to efficiently review and verify performance evaluation results.

Advantages of the disclosed system include an automated signal analysis process for predicting evaluation metrics from audio signal data of captured user interactions, such as by leveraging statistical inference algorithms (e.g., generative machine learning models) to identify relevant performance indicators (e.g., latent audio metadata, approximate sentiment attributes, and/or the like). As a result, the disclosed technology can minimize signal processing time for audio signal data for each captured interaction. Furthermore, the disclosed technology can generate streamlined user interfaces (e.g., via custom interactable components and/or arrangements) that simplifies review and validation workflows.

For illustrative purposes, some examples of systems and methods are described herein in the context of evaluating performance metrics for audio signal data of captured interactions between participant users of an enterprise service. However, a person skilled in the art will appreciate that the disclosed system can be applied in other contexts. As an example, the disclosed system can be used within distributed computing systems to streamline evaluation workflows for assessing performance metrics (e.g., an error rate, a service utilization rate, and/or the like) of computing services and/or processes.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Signal Processing System

FIG. 1 shows an example computing environment 100 that includes a signal processing system 102 in accordance with some implementations of the present technology. As described throughout this document, the signal processing system 102 can include hardware components and computer-executable code that enable automatic, contextual understanding of terms and phrases in a particular audio signal (e.g., a live feed or a recording of an interaction between two parties, where the parties can be individuals or computer-generated entities (e.g., chat bots, virtual assistants, and so forth)).

In an example, the signal processing system 102 can perform operations that include receiving audio signal data corresponding to a recorded interaction. The signal processing system 102 can convert the audio signal data into a transcript that includes alphanumeric components and automatically generate a prompt for a generative machine learning model (e.g., a GenAI, GenML model) to generate a response. The model can be trained to generate a response that maps at least one alphanumeric component of the converted transcript to a target signal domain group. The signal processing system 102 can additionally prompt a generative machine learning model (e.g., the same or different model) to generate a response that includes a set of alphanumeric elements from the at least one alphanumeric component, where the generated elements satisfy at least one signal extraction rule of the target signal domain group. The signal processing system 102 can generate a computer-based prediction for a set of attributes for the at least one alphanumeric component. The set of attributes can include sentiment attributes corresponding to the at least one alphanumeric component. Examples of automatically-generated sentiment attributes of the signal processing system 102 can include a tone, a keyword, a user satisfaction level, a descriptive emotion, an expression of satisfaction, a sentiment analysis graph, or a combination thereof. The signal processing system 102 can also contextualize information in the audio signal. For example, the signal processing system 102 can generate (e.g., automatically infer, automatically predict) a set of identifiable user features, such as a phone number, an account number, a policy number, a set of prior service interactions, a user context data corresponding to the at least one subscribing user, or a combination thereof. Furthermore, in some implementations, the outputs of various modules of the signal processing system 102 can be utilized to automatically assess the quality of an interaction captured in the audio signal. For instance, various portions of the audio signal can be automatically processed and/or scored to determine their accuracy, completeness, responsiveness, coherence, and so forth. Various portions of the audio signal can be automatically dropped, enhanced and/or replaced (e.g., based on the score or another parameter being out of bounds, such as 75%-100%) to contextualize or enhance items in the signal.

As shown, the computing environment 100 can be accessible to one or more external users 110 ("users 110") who can utilize components of the signal processing system 102 ("system 102"). The components can include an enterprise service 104, a signal extraction module 106, a signal processing module 108, machine learning (ML) models 120, a memory storing evaluation parameters 122, and an evaluation interface 130.

In an example, the signal processing system 102 is implemented using components of the example computer system 600 illustrated and described in more detail with reference to FIG. 6. Likewise, implementations of example environment 100 can include different and/or additional components or can be connected in different ways. For example, the computing servers 410 of FIG. 4 can be configured to perform one or more operations described herein with respect to the enterprise service 104, the signal extraction module 106, and/or the signal processing module 108. In additional examples, the computing databases 415 of FIG. 4 can be configured to perform one or more operations described herein with respect to the machine learning models 120 and/or the stored evaluation parameters 122. In some examples, various circuits (modules) of the systems described here can include integrated circuits (e.g., application specific integrated circuits (ASIC)) that can include a set of neurons and a set of synaptic circuits that link the neurons in a neural network. The neurons can include, for example, memory units (e.g., registers), processors units (e.g., microprocessors) and/or input gates. The synaptic circuits can include memory units that store synaptic weights.

The users 110 of the computing environment 100 represent an individual person or entity directly, or indirectly, interacting with the signal processing system 102 via a communication apparatus (e.g., telecommunications device, a digital user interface, and/or the like) coupled to one or more components of the system 102. For example, a subscribing user 112 ("subscriber 112") of an enterprise service 104 of the signal processing system 102 can directly communicate with other individuals, such as an authorized provider 114 ("provider 114") of the enterprise service 104, and/or services using an established communications channel (e.g., a phone call, a teleconference, a web-based communication, and/or the like). In another example, an authorized user 118 can communicate with components of the signal processing system 102 via an interactable user interface (e.g., evaluation interface 130).

A subscriber 112 represents an individual user of an application or service feature (e.g., a digital subscription, a web-based product and/or the like) provided by an enterprise service 104. A provider 114 represents an individual user associated with the enterprise service 104 (e.g., service maintenance staff, online consumer support, an automatic/robotic customer support agent, and/or the like) responsible for appropriate provisioning of the application or service feature to the subscriber 112. For example, a subscriber 112 can submit a service support request (e.g., an erroneous feature report, maintenance instructions, and/or the like) to be resolved by a provider of the enterprise service 104. Accordingly, a provider 114 can directly communicate (e.g., a live service call) with the requesting subscriber 112 to resolve the submitted request.

In some implementations, the signal processing system 102 can intercept or record captured interactions 116 between a given subscriber 112 and provider 114. In particular, the system 102 can configure the enterprise service 104 to host interactive communications (e.g., audio dialogue, user interface actions, and/or the like) between a subscriber 112 and a provider 114 via a communications channel (e.g., telephonic, internet, and/or the like) comprising a function (e.g., an integrated webhook) to actively record real-time user interactions. As an illustrative example, the system 102 can configure the enterprise service 104 to record streams of audio signal data (e.g., sound wave signals) captured from a telephonic communication (e.g., a phone call) between the subscriber 112 and the provider 114. In another example, the system 102 can configure the enterprise service 104 to record a chronologically ordered record (e.g., a timestamp log) of interface actions executed (e.g., via a user interface) by either the subscriber 112 or the provider 114. Although not explicitly depicted for clarity, the enterprise system 104 can be further configured to store recorded data (e.g., audio signal data, alphanumeric transcripts) associated with a captured interaction 116 of participant users at a remote database of the signal processing system 102, such as the example computing database 415 described with respect to FIG. 4.

In some implementations, the signal processing system 102 can configure the enterprise service 104 to receive data associated with a captured interaction 116 from participant users (e.g., subscriber 112 and/or provider 114). For example, the system 102 can store audio signal data directly transmitted (e.g., digital upload) from a user interface of either the subscriber 112 or the provider 114 of the enterprise service 104. In another example, the system 102 can receive (e.g., from a user interface, output of machine learning model) an alphanumeric (e.g., string text) transcript corresponding to audio signal data for a captured interaction 116. In some implementations, the received alphanumeric transcript can further comprise a metadata mapping of participant user identifiers (e.g., user identification number) to segments of the corresponding audio signal data (e.g., speaker diarization). In additional or alternative implementations, the system can be configured to handle read and/or write operations pertaining to audio signal data using common audio encoding formats, such as Waveform Audio File (WAV), Audio Interchange File Format (AIFF), Pulse-Code Modulation (PCM), Resource Interchange File Format (RIFF), Au, MP3, OGG, M4A, and/or the like. The system 102 can also be configured to execute one or more operations for audio signal data using codecs (e.g., audio compression formats, lossless file formats, and/or the like) specified via an Audio Compression Manager (ACM).

The signal extraction module 106 of the signal processing system 102 can be configured to execute operations for conditioning data (e.g., metadata extraction, signal enhancement, and/or the like) associated with captured interactions 116 (e.g., audio signal data/files, alphanumeric transcripts, and/or the like). In some implementations, the signal extraction module 106 can use one or more executable functions of open-source audio management libraries (e.g., FFMPEG, PyTorch, and/or the like) to perform one or more operations described herein. For example, the signal extraction module 106 can identify compatible encoding formats (e.g., WAV, MP3, OGG, and/or the like) associated with audio signal data of a recorded, or stored, captured interaction 116. The signal extraction module 106 can also be configured to extract metadata embedded within audio signal files, such as audio duration, audio channels, audio bitrate, audio silence detection, and/or other characteristics associated with audio signal data. Accordingly, the signal extraction module 106 can manipulate (e.g., via executable audio management functions) one or more signal characteristics (e.g., bitrate, channels, and/or the like) of an audio signal data to enhance qualitative features (e.g., signal strength) of audio data associated with a captured interaction 116. In additional or alternative implementations, the signal extraction module 106 can be configured to segregate one or more audio signal files based on audio signal channels associated with identifiable participant users of the captured interaction 116 (e.g., speaker diarization, speaker identification, and/or the like).

The signal extraction module 106 can be further configured to convert audio signal data (e.g., soundwave signals) of a captured interaction 116 into alphanumeric signal data (e.g., text transcripts). For example, the signal extraction module 106 can use one or more natural language processing (NLP) methods to transcribe audio signals for the captured interaction 116 into alphanumeric tokens (e.g., text strings). In some cases, the signal extraction module 106 can deploy a pre-trained linguistic model (e.g., a transformer sequence-to-sequence model) to generate a transcription of the audio signal data via execution of one or more audio processing tasks, including multilingual speech recognition, speech translation, and/or language identification. The signal extraction module 106 can further train, or finetune, the linguistic model using sample speech processing tasks (e.g., generation of token sequences predicted via model decoder) covering multilingual speech recognition, speech translation, spoken language identification, and/or voice activity detection. For example, the signal extraction module 106 can use training data samples to configure, and update, the linguistic model to generate alphanumeric sequences with special tokens corresponding to unique task specifiers (e.g., speech recognition, speech translation, language identification, and/or the like) and/or classification targets. Accordingly, the signal extraction module 106 can train the linguistic model to generate output transcripts with embedded speaker diarization, timestamps of audible speech, and/or additional annotated transcription features.

The signal extraction module 106 can be further configured to extract metadata information from transcribed audio information. For example, the signal extraction module can use natural language processing (NLP) analysis tools, such as machine learning models 120, to determine key contextual information associated with a captured interaction 116, such as domain group classification (e.g., speaker intent categorization), content details (e.g., objective and/or factual information), and/or sentiment analysis (e.g., identifying emotional characteristics of speakers).

The signal extraction module 106 can be configured to perform domain group classification (e.g., speaker intent categorization) using transcription data associated with a captured interaction 116. A domain group classification corresponds to a category of alphanumeric text, and/or audio signal data, associated with a dialogue subject (e.g., topic of conversation) for the captured interaction 116. Examples of domain group classes include a provider introduction, a subscriber reassurance (e.g., statement of confidence), a variable reading error, a service transaction, a contextual complaint report, vulnerability identification, a product promotion, or a combination thereof. In some implementations, the signal extraction module 106 can assign an appropriate domain group for one or more alphanumeric components (e.g., portions of text-based transcript) of the converted transcript for the captured interaction 116. In particular, the signal extraction module 106 can use the mapping between participant users and audio signal data (e.g., speaker diarization) to partition portions of the transcript of a captured interaction 116 into individual alphanumeric components that are each assigned to a respective participant user. Accordingly, the signal extraction module 106 can assign a domain group to each individual alphanumeric component indicating dialogue intent associated with the assigned participant user (e.g., speaker intent). In some implementations, the signal extraction module 106 can perform domain group classification using machine learning models 120 (e.g., transformers, large language models, and/or the like) pre-trained on a user profile associated with a participant subscriber 112 of the captured interaction 116.

The signal extraction module 106 can be configured to extract detailed dialogue contents from converted transcripts for a captured interaction 116. Detailed dialogue contents correspond to extractive (e.g., factual) and/or abstractive (e.g., conceptual) information identifiable from alphanumeric components (e.g., text strings) of the transcript for a captured interaction 116. Examples of detailed dialogue contents can include a debt amount, an address, a variable usage amount, a substantial charge, a contextual exception phrase (e.g., "however," "but," "except," "unless," and/or the like), a vulnerability, a subscriber identity, an action performed by a provider, a focus topic of the captured interaction, or a combination thereof. In some implementations, the signal extraction module 106 can perform extraction of detailed dialogue contents using machine learning models 120 (e.g., transformers, large language models, multi-model systems) pre-trained on question-and-answer (QnA) type comprehension. In additional or alternative implementations, the signal extraction module 106 can further train, or finetune, the machine learning models 120 to identify key dialogue contents based on a domain knowledge framework (e.g., extraction rules, domain objectives, key identifiers, and/or the like) accessed from a remote database 415 of the signal processing system 102.

The signal extraction module 106 can be configured to perform sentiment analysis for participant users (e.g., subscriber 112, provider 114) of a captured interaction 116. For example, the signal extraction module 106 can use machine learning models (e.g., transformers, large language models) to evaluate alphanumeric components of transcripts for the captured interaction 116 to determine a set of sentimental attributes and/or emotion characteristics (e.g., satisfaction, dissatisfaction, neutral, and/or the like) associated with participant users. In some implementations, the signal extraction module 106 can use the determined set of sentimental attributes to generate a visual representation of emotional characteristics, such as a sentiment graph, that are expressed within the captured interaction 116.

In further implementations, the signal extraction module 106 can be configured to perform one or more operations described herein on a cloud-based computing infrastructure capable of scaling availability of computing resources. In particular, the signal extraction module 106 can configure the cloud-based computing infrastructure to automatically scale (e.g., increase and/or decrease available computing resources) with respect to approximate volume and intake rate of data (e.g., audio signals, alphanumeric texts) associated with a captured interaction 116.

The signal processing module 108 of the signal processing system 102 can be configured to evaluate performance metrics for a captured interaction 116 between a subscriber 112 and provider 114 of an enterprise service 104. For example, the signal processing module 108 can determine a set of evaluation criteria for assessing performance scores for the captured interaction 116 based on extracted metadata information from the signal extraction module 106. In particular, the signal processing module 108 can use the domain group classifications, the extracted dialogue content, and/or the estimated sentiment attributes of a transcript (e.g., alphanumeric contents) of the captured interaction 116 to automatically identify a pre-defined performance evaluation module, or ruleset, from a remote database of evaluation parameters 122. As a result, the signal processing module 108 can use the evaluation criteria associated with the performance evaluation module to determine a set of performance scores (e.g., a quantitative metric, a categorical classification, and/or the like) for the transcript of the captured interaction 116. In additional or alternative implementations, the signal processing module 108 can aggregate the set of performance scores for the transcript of the captured interaction 116 into a consolidated performance report 132.

A performance evaluation module comprises a unique set of criteria (e.g., sentiment attribute threshold, presence of specific dialogue details, content similarity to assigned domain group knowledge base, and/or the like) for evaluating compliance of a captured interaction 116 to a target performance objective. As an illustrative example, a target performance objective can include detecting expressions of dissatisfaction, which assesses approximate sentiment, tone, and/or keyword usage from the captured interaction 116 that indicate satisfaction levels of a subscriber 112. As another example, a target performance objective can include detecting user experiences, which evaluates response time, issue resolution, professionalism, and engagement of providers 114 to gauge the quality of captured interactions 116. In another example, a target performance objective can include vulnerability detection, which aims to identify signs of distress or negative health conditions associated with subscribers 112 of the enterprise service 104. In a further example, a target performance objective can include a domain-specific analysis, which evaluates compliance of the captured interaction 116 to industry-specific regulations and/or standards.

The signal processing module 108 can be configured to display the generated performance report 132 at a custom user interface that is accessible to authorized reviewers of the signal processing system 102. For example, the signal processing module 108 can display the performance report 132 of a captured interaction 116 at an evaluation interface 130 associated with an authorized user 118 (e.g., a verified content and/or performance reviewer). In some implementations, the evaluation interface 130 can visually display aspects of the performance report 132 (e.g., quantitative and/or qualitative performance metrics) at custom user interface elements configured to highlight significant results (e.g., outlier performance, underperforming results, and/or the like) that requires review from the authorized user 118. In some implementations, the evaluation interface 130 can be configured to enable the authorized user 118 to provide user feedback 134 data (e.g., validation of results, performance metric correction, and/or the like) regarding the generated performance report 132 of the captured interaction 116. In response to receiving user feedback 134 from the authorized user 118, the signal processing module 108 can update, or revise, one or more aspects (e.g., performance scores) of the performance report 132. In some implementations, the signal processing module 108 can use the user feedback 134 data to re-train, or finetune, machine learning models 120 used by the signal processing system 102.

Example Signal Evaluation Use Cases for the Signal Processing System

Figure 2A:
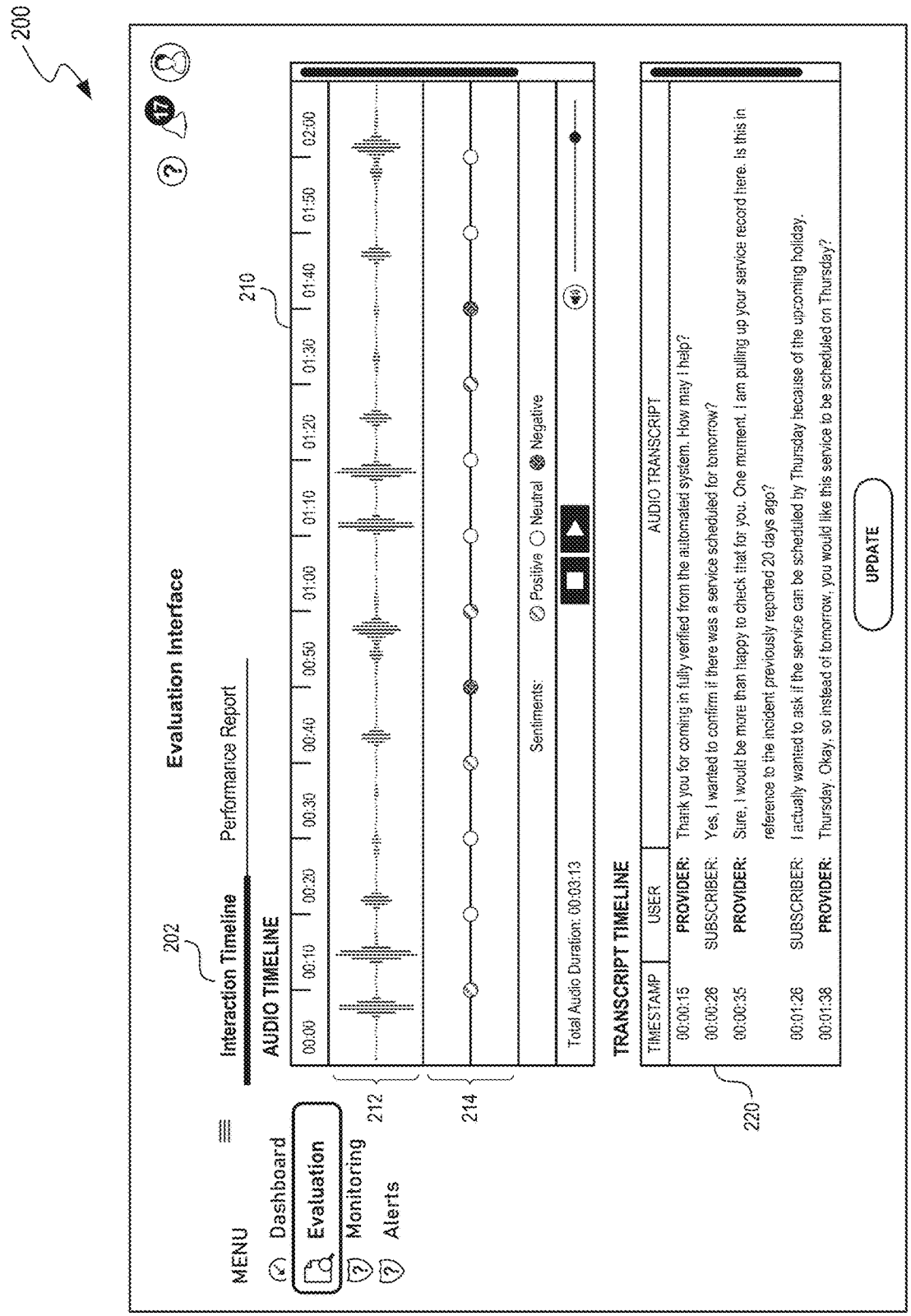
Figure 2C:
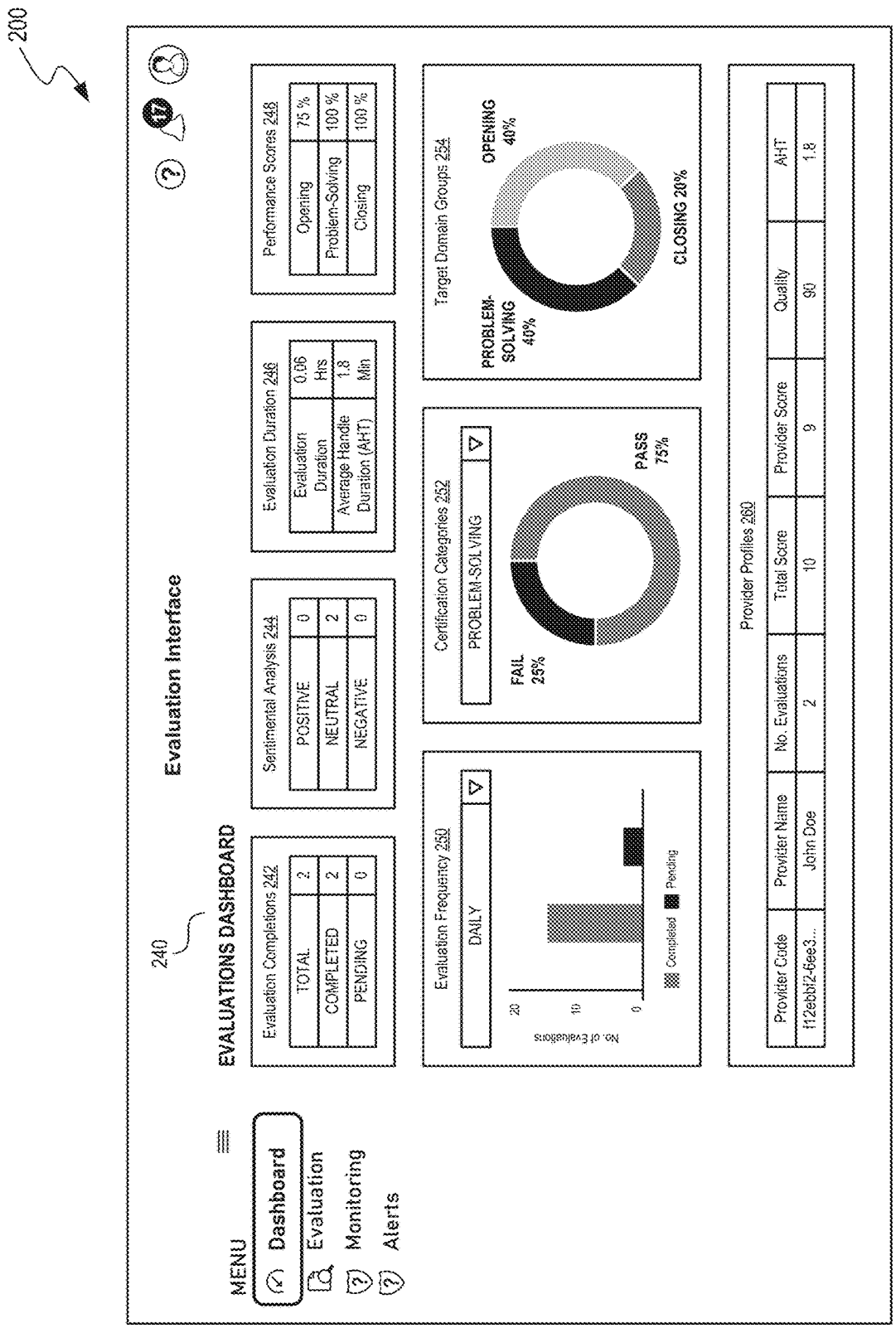

FIGS. 2A-C show an example graphical user interface 200 ("interface 200") that demonstrates aspects of a signal evaluation interface of the signal processing system 102 of FIG. 1 in accordance with some implementations of the present technology. Interface 200 is implemented using components of the example computer system 600 illustrated and described in more detail with reference to FIG. 6. Likewise, implementations of interface 200 can include different and/or additional components or can be connected in different ways. Interface 200 is a visual interface that allows users (e.g., an authorized user) to interact with electronic devices using graphical elements (e.g., windows, icons, buttons, and/or the like) rather than text-based commands.

As shown in FIG. 2A, the interface 200 includes an interaction timeline 202 that can be configured to display an audio timeline 210, an audio signal graph 212, a sentiment analysis graph 214, a transcript timeline 220, or a combination thereof. Interface 200 presents a custom user interface component (e.g., an application widget, a website page, and/or the like) for an interaction timeline 202 that comprises a set of time-dependent signal analysis tools (e.g., audio timeline 210, transcript timeline 220) associated with a captured interaction (e.g., an audio recorded conversation).

The audio timeline 210 component of the interaction timeline 202 enables users to review portions of an audio signal data corresponding to a captured interaction. For example, the audio timeline 210 comprises a set of audio controls (e.g., a play button, a stop button, a volume control, and/or the like) that enable users to playback portions of the audio signal data (e.g., via audio generating devices coupled to the interface 200). In some implementations, the audio timeline 210 can be configured to display a partial view of the total audio signal data of the captured interaction. As shown in FIG. 2A, the audio timeline 210 can include an interactable scroll component (e.g., a vertical and/or horizontal scroll widget) that enables the user to shift the view window (e.g., visualized portion) for the audio signal data of the captured interaction.

The audio timeline 210 component of the interaction timeline 202 comprises an audio signal graph 212 that visualizes a temporal mapping (e.g., timestamp aligned data) for audio signal data of the captured interaction. As an illustrative example, the audio signal graph 212 can display a graphic audio wave with a magnitude (e.g., wave height) proportional to the audio signal strength at a specified timestamp. In some implementations, the audio signal graph 212 can be aligned to a visual timeline that is partitioned into specified time intervals. As shown in FIG. 2A, the displayed audio signal graph 212 can be aligned below a horizontal bar comprising referential timestamp markings (e.g., ticks) that are evenly distributed (e.g., via intervals of 10 seconds).

The audio timeline 210 component of the interaction timeline 202 can comprise a sentiment analysis graph 214 that visualizes a temporal mapping (e.g., timestamp aligned data) for sentiment analysis results, such as approximate emotional characteristics, of audio signal data corresponding to the captured interaction. As an illustrative example, the sentiment analysis graph 214 can display a unique visual marking (e.g., a patterned geometry) for an estimated emotion (e.g., positive, neutral, negative, and/or the like) of a speaker associated with an audio signal data at a specified timestamp. In some implementations, the sentiment analysis graph 214 can be aligned to a visual timeline that is partitioned into specified time intervals, similar to the audio signal graph 212. As shown in FIG. 2A, the displayed sentiment analysis graph 214 can be aligned below a horizontal bar comprising referential timestamp markings (e.g., ticks) that are evenly distributed (e.g., via intervals of 10 seconds). In further implementations, the sentiment analysis graph 214 can comprise a visual mapping (e.g., a graphical legend and/or key) between each unique visual marking and an estimated emotion of a speaker. In additional or alternative implementations, the sentiment analysis graph 214 can be configured to enable users to add and/or modify assigned labels (e.g., estimated emotion) for specified portions of the audio signal data (e.g., timestamp). Accordingly, the sentiment analysis graph 214 can be further configured to store (e.g., at a remote database) user submitted modifications to the assigned labels in response to an interface confirmation (e.g., selection of the "update" button).

The transcript timeline 220 component of the interaction timeline 202 comprises a temporal mapping (e.g., timestamp aligned data) for alphanumeric components (e.g., transcript texts) corresponding to portions of audio signal data of a captured interaction. As shown in FIG. 2A, the transcript timeline 220 can comprise an interactable interface component (e.g., a scrollable widget) that displays a set of audio transcripts that each align to an associated timestamp for corresponding portions of the audio signal data. In some implementations, the transcript timeline 220 can include an additional metadata field for information associated with the displayed audio transcript, such as an identified participant user (e.g., speaker diarization) corresponding to specified portions of the audio signal data. In additional or alternative implementations, the transcript timeline 220 can further display unique visual markings (e.g., bolded text, colored highlights, and/or the like) to distinguish categories of the displayed metadata fields, such as between individual identified users and/or speakers. In some implementations, the transcript timeline 220 can be configured to display the set of audio transcripts in a tabular arrangement. In some implementations, the transcript timeline 220 can be configured to display the set of audio transcripts aligned to a graphical timeline (e.g., a horizontal bar with referential timestamp markings), similar to the audio signal graph 212 and/or the sentiment analysis graph 214.

The interaction timeline 202 can be configured to enable an authorized user (e.g., a verified reviewer) to modify and/or update (e.g., via the interface 200) the audio signal data of the captured interaction. As an illustrative example, the interaction timeline 202 can enable a user to adjust (e.g., crop, align, magnify, and/or the like) portions of the audio signal data via the audio signal graph 212. In another example, the interaction timeline 202 can enable a user to reassign portions of the audio signal data to a different participant user and/or speaker. In a further example, the interaction timeline 202 can enable a user to reassign portions of the audio signal data and/or audio transcripts to a different timestamp. In an additional example, the interaction timeline 202 can enable a user to reassign predicted labels (e.g., approximated emotional characteristics) for portions of the audio signal data at the sentiment analysis graph 214. In additional or alternative implementations, the interaction timeline 202 can be configured to generate an export electronic file format (e.g., Portable Document Format (PDF), Comma-Separated Values (CSV), Microsoft Excel, and/or the like) comprising data associated with the audio signal data of the captured interaction, such as the displayed information on components of the interaction timeline 202 (e.g., audio timeline 210, transcript timeline 220).

As shown in FIG. 2B, the interface 200 includes a performance report 204 that can be configured to display a signal evaluation component 230, an evaluation criterion 231, a signal performance score 232, a confidence score 233, a certification category 234, a supplemental data source 235, a signal domain group 236, or a combination thereof. Interface 200 presents a custom user interface component (e.g., an application widget, a website page, and/or the like) for a performance report 204 that comprises a tabular interface enabling users (e.g., authorized users) to review, and calibrate, performance results determined from a captured interaction (e.g., an audio recorded conversation).

The performance report 204 enables users to review performance evaluation results (e.g., generated via the signal evaluation system) corresponding to audio signal data of a captured interaction. For example, the performance report 204 comprises a set of signal evaluation components 230 that each display (e.g., at a user interface) approximate performance metrics for a specified portion of the audio signal data. The signal evaluation component 230 can comprise an evaluation criterion 231 used to determine compliance of the specified portion of the audio signal data to a set of guidelines (e.g., expected performance thresholds, target objectives, and/or the like). In some implementations, the signal evaluation component 230 can transform the evaluation criterion 231 to be displayed in a natural language (e.g., human-readable) format, such as a descriptive narrative, a questionnaire entry, and/or the like.

The signal evaluation component 230 can comprise a signal performance score 232 for the specified portion of the audio signal data that is generated by the signal evaluation system. The signal performance score 232 is representative of an approximate compliance measure (e.g., a rating, a score, and/or the like) of the specified portion of the audio signal data to the evaluation criterion 231. In some implementations, the signal evaluation component 230 can further comprise a confidence score 233 corresponding to the signal performance score 232 generated by the signal evaluation system. In particular, the confidence score 233 indicates an approximate measure of validity (e.g., an estimated probability of accuracy) for the signal performance score 232 corresponding to the specified portion of the audio signal data.

The signal evaluation component 230 can comprise a certification category 234 corresponding to the signal performance score 232 for the specified portion of the audio signal data. The certification category 234 is representative of a class, or category, label (e.g., "pass," "fail," "below standards," "meeting standards," "exceeding standards," and/or the like) for a group of performance scores (e.g., a range of scores within thresholds). In some implementations, the signal evaluation system can determine a corresponding certification category 234 for a signal performance score 232 using a pre-determined mapping of performance score thresholds to certification categories 234.

The signal evaluation component 230 can comprise a supplemental data source 235 for the specified portion of the audio signal data. As shown in FIG. 2B, the supplemental data source 235 can comprise a transcribed text (e.g., audio transcript) corresponding to the specified portion of the audio signal data. In further implementations, the supplemental data source 235 can comprise annotative components that complement the transcribed text. For example, the supplemental data source 235 can include a set of timestamps that correspond to the portion of audio signal data associated with the transcribed text. In some implementations, the supplemental data source 235 can comprise an interactable interface component (e.g., a button, a slider, and/or the like) that enables users to playback the specified portion of the audio signal data at the user interface.

The signal evaluation component 230 can be assigned to a signal domain group 236 associated with the audio signal data. The signal domain group 236 is representative of an identifiable class, or type, of audio signals determined from a captured interaction. As an illustrative example, a captured interaction for a conversation between participant users can correspond to a set of signal domain groups 236 indicative of distinct stages of the conversation, such as an introduction (e.g., "Opening Statements"), a conversation topic (e.g., "Problem-Solving"), a conclusion, and/or the like. Accordingly, the performance report 204 can be configured to display the set of signal evaluation components 230 in an arrangement that groups each signal evaluation component 230 to an assigned signal domain group 236, as illustrated in FIG. 2B. In additional or alternative implementations, the signal evaluation components 230 of the performance report 204 can be displayed in a tabular arrangement.

The performance report 204 can be configured to enable an authorized user (e.g., a verified reviewer) to modify and/or update (e.g., via the interface 200) the performance evaluation results for the audio signal data of the captured interaction. As an illustrative example, the performance report 204 can enable a user to adjust values (e.g., via user interactable components) of a signal evaluation component 230, such as the signal performance score 232, the certification category 234, the supplemental data source 235 (e.g., audio transcript, annotations, and/or the like), or a combination thereof. In additional or alternative implementations, the performance report 204 can be configured to generate an export electronic file format (e.g., Portable Document Format (PDF), Comma-Separated Values (CSV), Microsoft Excel, and/or the like) comprising data associated with the performance evaluation results for the audio signal data of the captured interaction, such as the displayed information on components of the performance report 204 (e.g., evaluation criterion 231, signal performance score 232, confidence score 233, certification category 234, supplemental data source 235, and/or the like).

As shown in FIG. 2C, the interface 200 includes a signal evaluation dashboard 240 that can be configured to display an evaluation status component 242, a sentiment analysis component 244, an evaluation duration component 246, a performance score component 248, an evaluation frequency component 250, a certification category component 252, a target domain group component 254, a provider profile component 260, or a combination thereof. Interface 200 presents a custom user interface component (e.g., an application widget, a website page, and/or the like) for an evaluation dashboard 240 that comprises an interactable interface that enables users (e.g., authorized users) to review summarized performance results for captured interactions of participant users (e.g., service providers).

The evaluations dashboard 240 ("dashboard 240") enables users to review a summary of accumulated performance evaluation results (e.g., generated via the signal evaluation system) for a set of captured interactions. In particular, the dashboard 240 can display a custom arrangement of interface components that each present one or more aggregated performance metrics associated with the set of captured interactions. For example, the dashboard 240 can comprise an evaluation status component 242 that displays cumulative evaluation status (e.g., "completed," "pending," and/or the like) for the set of captured interactions. In another example, the dashboard 240 can comprise a sentiment analysis component 244 that displays cumulative metrics (e.g., numeric counts) for sentiment labels (e.g., "positive," "neutral," "negative," and/or the like) that correspond to the approximated emotional characteristics of the set of captured interactions. In a further example, the dashboard 240 can comprise an evaluation duration component 246 that displays cumulative durations (e.g., total evaluation time, average handle duration (AHT), and/or the like) that track elapsed time for evaluating signal performance of the set of captured interactions. In another example, the dashboard 240 can comprise a performance score component 248 that displays cumulative metrics (e.g., numeric percentages) for performance results corresponding to signal domain groups 236 for the set of captured interactions.

In some implementations, the evaluations dashboard 240 can display a custom arrangement of graphical interface components that each present a visual representation of one or more aggregated performance metrics associated with the set of captured interactions. For example, the dashboard 240 can comprise an evaluation frequency component 250 that displays cumulative evaluation status (e.g., "completed," "pending," and/or the like) for the set of captured interactions within a user-specified (e.g., via a selection menu, or similar interactive components) time interval (e.g., minutes, days, weeks, and/or the like) via a visual graphic (e.g., a histogram, a bar graph, and/or the like). In another example, the dashboard 240 can comprise a certification category component 252 that displays cumulative metrics (e.g., numeric percentages) for assigned certification categories 234 of the set of captured interactions via a visual graphic (e.g., a pie chart, a doughnut chart, and/or the like). In some implementations, the certification category component 252 enables users to filter (e.g., via a selection menu, or similar interactive components) certification categories 234 of the set of captured interactions based on a specified signal domain group 236. In a further example, the dashboard 240 can comprise a target domain group component 254 that displays cumulative metrics (e.g., numeric percentages) for assigned signal domain groups 236 of the set of captured interactions via a visual graphic (e.g., a pie chart, a doughnut chart, and/or the like).

In some implementations, the evaluations dashboard 240 can present a provider profile component 260 that displays a set of performance evaluation metrics associated with participant users of the set of captured interactions. For example, the provider profile component 260 can display a list of authorized service providers (e.g., an identified speaker) associated with audio signal data for the set of captured interactions. As shown in FIG. 2C, the provider profile component 260 can display additional metadata information and/or relevant performance evaluation metrics corresponding to each listed service provider, such as a provider identifier (e.g., an identification code), a provider name, a total number of evaluations (e.g., involving the provider), a total achievable score (e.g., for evaluations involving the provider), a total provider score (e.g., achieved by the provider), a quality score (e.g., of provider performance), an evaluation duration (e.g., average handling duration), and/or the like. In some implementations, the provider profile component 260 of the evaluation dashboard 240 can be displayed in a tabular arrangement, as shown in FIG. 2C. In additional or alternative implementations, the evaluation dashboard 240 can be configured to generate an export electronic file format (e.g., Portable Document Format (PDF), Comma-Separated Values (CSV), Microsoft Excel, and/or the like) comprising summarized data associated with the set of captured interactions, such as the displayed information on components of the evaluation dashboard 240 (e.g., evaluation status component 242, sentiment analysis component 244, evaluation duration component 246, performance score component 248, evaluation frequency component 250, certification category component 252, target domain group component 254, provider profile component 260, and/or the like).

Example Signal Evaluation Operations of the Signal Processing System

Figure 3:
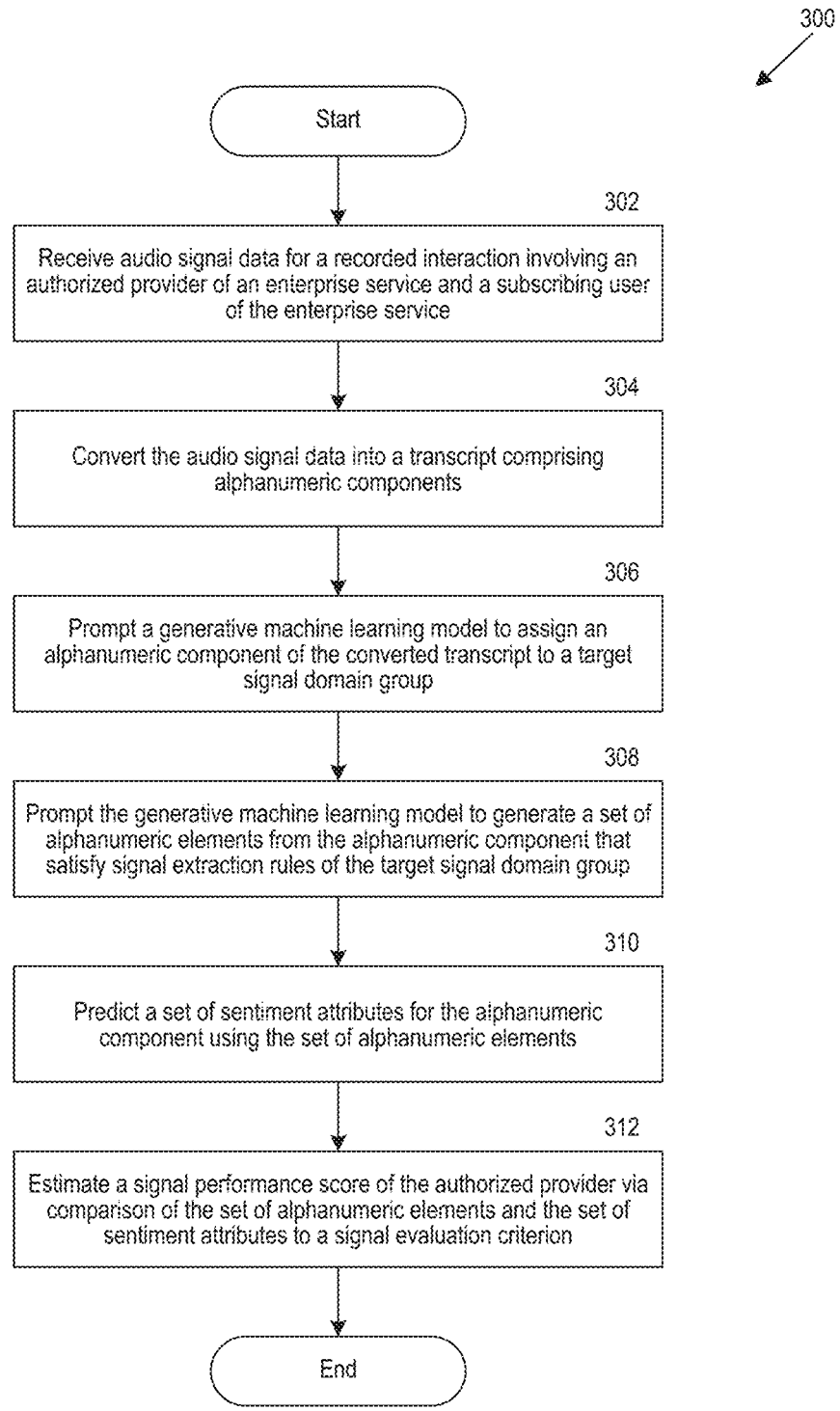
FIG. 3 is a flow diagram that illustrates an example process for evaluating signal performance in some implementations of the present technology.

FIG. 3 is a flow diagram that illustrates an example process for evaluating signal performance in some implementations of the present technology. The process 300 can be permed by a system (e.g., signal processing system 100) configured to evaluate alphanumeric features (e.g., text transcripts) derived from an audio signal data according to one or more signal processing criteria. In one example, the system includes at least one hardware processor and at least one non-transitory memory storing instructions, which, when executed by the at least one hardware processor, cause the system to perform the process 300. In another example, the system includes a non-transitory, computer-readable storage medium comprising instructions recorded thereon, which, when executed by at least one data processor, cause the system to perform the process 300.

At 302, the system can receive audio signal data corresponding to a recorded interaction involving at least one authorized provider of an enterprise service and at least one subscribing user of the enterprise service such that the at least one subscribing user of the enterprise service is associated with a user service profile.

In some implementations, the system can use audio signal data of the recorded interaction to determine an encoding format that corresponds to a real-time audio stream, a stored audio file, an existing transcript of the audio signal data, or a combination thereof. Using the encoding format, the system can determine a set of audio signal properties from a metadata component of the audio signal data. As a result, the system can use a machine learning model to generate an enhanced version of the audio signal data that exceeds an audio quality threshold such that the enhanced version of the audio signal data comprises at least one modified audio signal property from the set of audio signal properties. In some implementations, the set of audio signal properties can comprise a file format, a bit rate, a sample rate, a number of audio channels, a signal duration, a silence duration, a codec, a gain of frequencies, a compression level, or a combination thereof.

At 304, the system can convert the audio signal data into a transcript comprising alphanumeric components. For example, the system can use a machine learning model (e.g., a natural language processing method, a text-to-speech algorithm, a generative machine learning model, and/or the like) to convert the audio signal data into an alphanumeric-based transcript.

At 306, the system can prompt a generative machine learning model to generate a response that maps at least one alphanumeric component of the converted transcript to a target signal domain group. For example, the target signal domain group can comprise an introduction for the at least one authorized provider, a statement of confidence for the at least one subscribing user, a variable reading error, a transaction, a contextual complaint report, a vulnerability, a promotion, or a combination thereof. In some implementations, the target signal domain group can comprise at least one signal extraction rule for determining target alphanumeric elements within alphanumeric components of the converted transcript, at least one signal processing criterion for evaluating performance scores associated with the at least one authorized provider, or a combination thereof. In some implementations, configuration of the prompt for the generative machine learning model comprises a set of identifiable user features from the user service profile. For example, the set of identifiable user features from the user service profile can comprise a phone number, an account number, a policy number, a set of prior service interactions, a user context data corresponding to the at least one subscribing user, or a combination thereof.

In some implementations, the system can generate at least one reference sample comprising a prior alphanumeric component and an assigned signal domain group. For example, the system can obtain the at least one reference sample from the user service profile of the at least one subscribing user. Accordingly, the system can be further configured to modify a request context of the prompt of the generative machine learning model for assigning the at least one alphanumeric component of the converted transcript to the target signal domain group to comprise the at least one reference sample.

At 308, the system can prompt the generative machine learning model to generate a response that includes a set of alphanumeric elements from the at least one alphanumeric component such that the set of alphanumeric elements satisfy the at least one signal extraction rule of the target signal domain group. In some implementations, the set of alphanumeric elements can comprise an account identifier, a debt amount, an address, a variable usage amount, a substantial charge, a contextual exception phrase, a vulnerability, an identity of the at least one subscribing user, an action performed by the at least one authorized provider, a focus topic of the recorded interaction, or a combination thereof.

At 310, the system can predict a set of sentiment attributes corresponding to the at least one alphanumeric component of the converted transcript. For example, the system can use the determined set of alphanumeric elements to predict the set of sentiment attributes for the at least one alphanumeric component. In some implementations, the set of sentiment attributes corresponding to the at least one alphanumeric component can comprise a tone, a keyword, a user satisfaction level, a descriptive emotion, an expression of satisfaction, a sentiment analysis graph, or a combination thereof.

At 312, the system can estimate a signal performance score of the at least one authorized provider. For example, the system can use a comparison of the set of alphanumeric elements and the set of sentiment attributes to the at least one signal processing criterion to estimate the signal performance score. In some implementations, the system can generate at least one reference sample comprising a prior set of alphanumeric elements, a prior set of sentiment attributes, and/or an assigned signal domain group in response to the estimated signal performance score exceeding an incompatibility threshold.

In some implementations, the system can generate the at least one reference sample using data from a remote database, a dynamic look-up table, a response of the generative machine learning model, a retrieval augmented generation (RAG) process, or a combination thereof. Using the at least one reference sample, the system can prompt the generative machine learning model to generate a response comprising a recommended signal domain group for the at least one alphanumeric component. Accordingly, the system can display a real-time notification alert comprising the recommended signal domain group at a user interface.

In some implementations, the system can display a custom interface component enabling an authorized user to modify a set of configurable interface elements at a user interface. For example, the system can configure the custom interface component such that the set of configurable interface elements comprises, at least in part, a first user configurable element associated with the signal performance score and a second user configurable element associated with the set of alphanumeric elements. In some implementations, the system can further configure the custom interface component to comprise an interactable audio component that, when selected by the authorized user, facilitates playback of at least a portion of the audio signal data corresponding to the set of alphanumeric elements.

In further implementations, the system can access a signal certification map comprising an association of signal performance score thresholds to at least one signal certification category. Using the signal certification map, the system can determine at least one signal performance score threshold corresponding to the estimated signal performance score. Accordingly, the system can display a signal certification category associated with the at least one signal performance score at the custom interface component of the user interface when the estimated signal performance score exceeds the at least one signal performance score threshold.

In some implementations, the system can receive (e.g., from the user interface) a validation signal from the authorized user verifying the estimated signal performance score. Further, the system can obtain a set of prior signal performance scores corresponding to prior recorded interactions involving the at least one authorized provider of the enterprise service, the at least one subscribing user of the enterprise service, or a combination thereof. Accordingly, the system can use the set of prior signal performance scores and the estimated signal performance score to generate an aggregate performance score. The system can also display a notification comprising at least one recommendation for improving the aggregate performance score at the user interface.

In some implementations, the system can receive (e.g., from the user interface) a user correction of contents for at least one user configurable element from the set of configurable interface elements. For example, the system can receive a user correction that comprises an initial outcome predicted via the generative machine learning model, a corresponding calibration outcome inputted by the authorized user, or a combination thereof. Accordingly, the system can update the generative machine learning model (e.g., fine-tune, train) using the initial outcome and the corresponding calibration outcome.

In additional or alternative implementations, the system can use the audio signal data and the converted transcript to determine at least one participant of the recorded interaction corresponding to the at least one alphanumeric component. The system can further display a visual interface component comprising the set of alphanumeric elements of the at least one alphanumeric component at the user interface. In some implementations, the visual interface component can comprise an alphanumeric identifier corresponding to the at least one participant, a visual marking of the at least one alphanumeric component that corresponds to at least one sentiment attribute from the set of sentiment attributes, or a combination thereof.

Example Computing Environment

Figure 4:
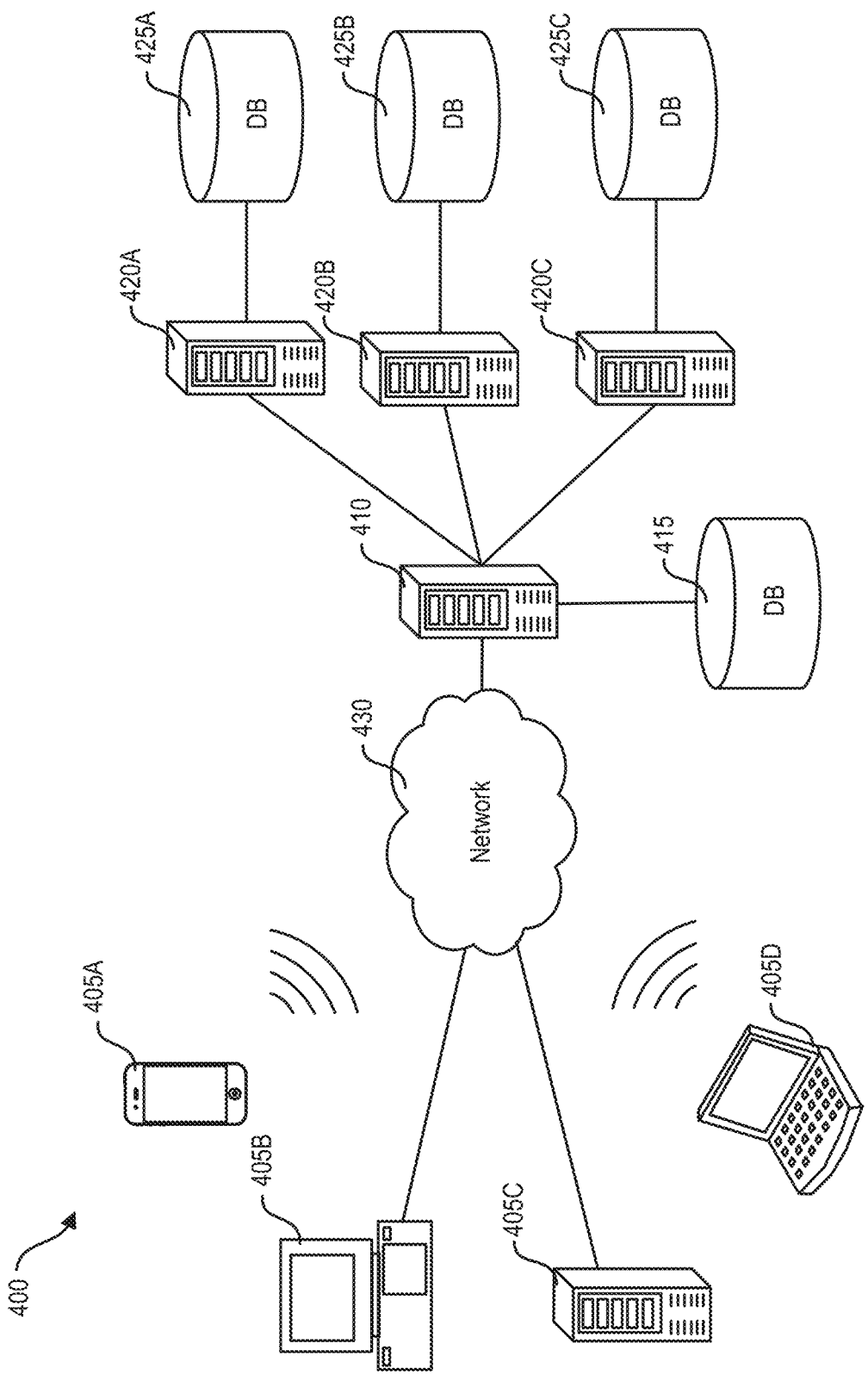
FIG. 4 is a system diagram illustrating an example of a computing environment in which the disclosed system operates in some implementations.

FIG. 4 is a system diagram illustrating an example of a computing environment in which the disclosed system operates in some implementations. In some implementations, environment 400 includes one or more client computing devices 405A-D, examples of which can host the signal processing system 100 of FIG. 1. Client computing devices 405 operate in a networked environment using logical connections through network 430 to one or more remote computers, such as a server computing device.

In some implementations, server 410 is an edge server which receives client requests and coordinates fulfillment of those requests through other servers, such as servers 420A-C. In some implementations, server computing devices 410 and 420 comprise computing systems, such as the signal processing system 100 of FIG. 1. Though each server computing device 410 and 420 is displayed logically as a single server, server computing devices can each be a distributed computing environment encompassing multiple computing devices located at the same or at geographically disparate physical locations. In some implementations, each server 420 corresponds to a group of servers.

Client computing devices 405 and server computing devices 410 and 420 can each act as a server or client to other server or client devices. In some implementations, servers (410, 420A-C) connect to a corresponding database (415, 425A-C). As discussed above, each server 420 can correspond to a group of servers, and each of these servers can share a database or can have its own database. Databases 415 and 425 warehouse (e.g., store) information such as claims data, email data, call transcripts, call logs, policy data and so on. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. In some implementations, network 430 is the Internet or some other public or private network. Client computing devices 405 are connected to network 430 through a network interface, such as by wired or wireless communication. While the connections between server 410 and servers 420 are shown as separate connections, these connections can be any kind of local, wide area, wired, or wireless network, including network 430 or a separate public or private network.

Figure 5:
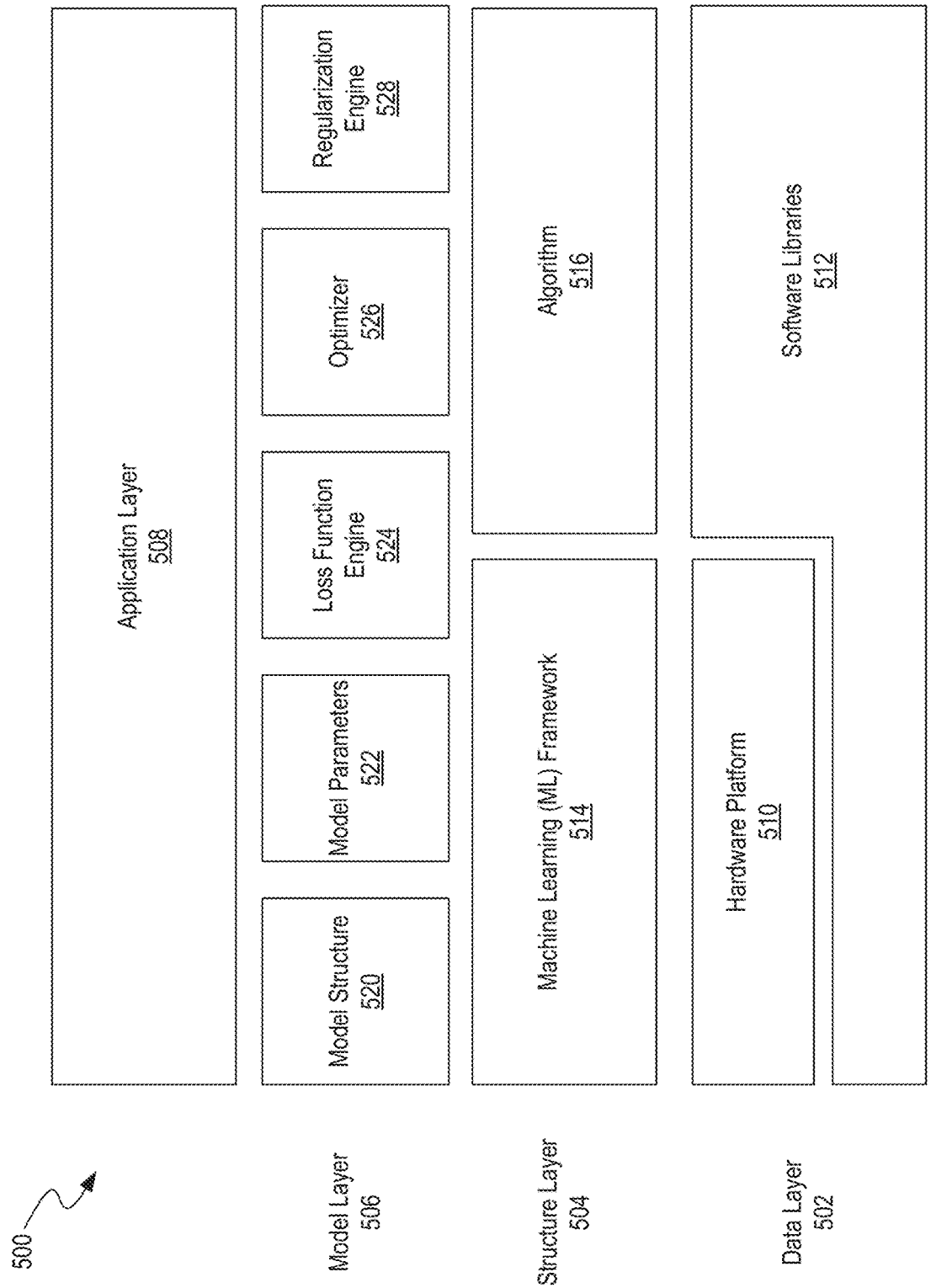
FIG. 5 illustrates a layered architecture of an artificial intelligence (AI) system that can implement the ML models of the signal processing system of FIG. 1, in accordance with some implementations of the present technology.

FIG. 5 illustrates a layered architecture of an artificial intelligence (AI) system 500 that can implement the ML models of the signal processing system 100 of FIG. 1, in accordance with some implementations of the present technology. Example ML models can include the models executed by the machine learning models 120. Accordingly, the machine learning models 120 can include one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 4 and 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include pre-processed data generated by various engines of the signal processing system 100 described in relation to FIG. 1. The user may label the training data based on one or more classes and trains the AI model by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constrain the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include the evaluation interface 130 of the signal processing system 102.

Example Computer System

Figure 6:
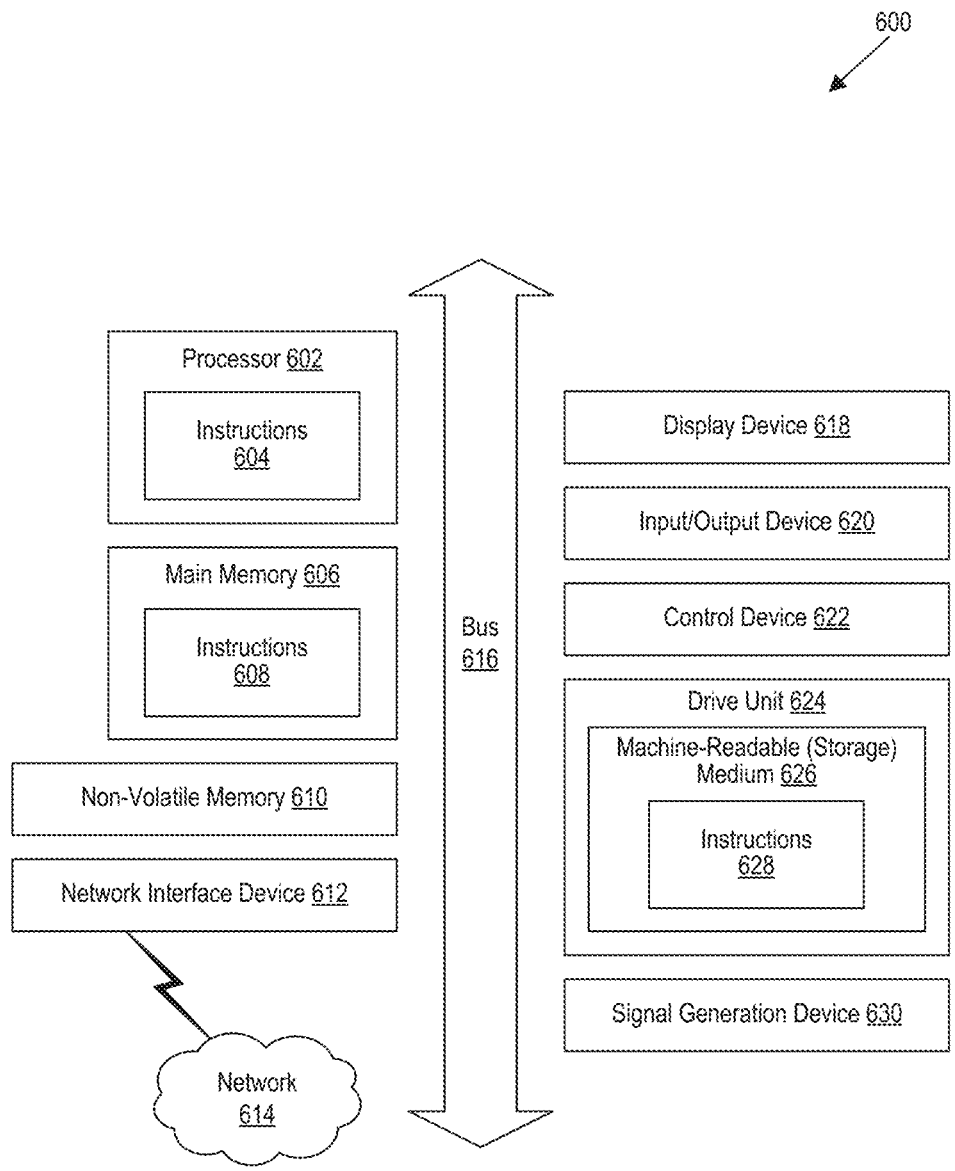
FIG. 6 is a block diagram that illustrates an example of a computer system in which at least some operations described herein can be implemented in accordance with some aspects of the present technology.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Further Examples

A method performed by a signal processing system can include receiving audio signal data corresponding to a recorded interaction involving at least one authorized provider of an enterprise service and at least one subscribing user of the enterprise service. The at least one subscribing user of the enterprise service can be associated with a user service profile. The method can include converting, using a machine learning model, the audio signal data into a transcript comprising alphanumeric components. The method can include prompting a generative machine learning model to generate a response that maps at least one alphanumeric component of the converted transcript to a target signal domain group, wherein configuration of the prompt for the generative machine learning model comprises a set of identifiable user features from the user service profile, and wherein the target signal domain group comprises: at least one signal extraction rule for determining target alphanumeric elements within alphanumeric components of the converted transcript, and at least one signal processing criterion for evaluating performance scores associated with the at least one authorized provider. The method can include prompting the generative machine learning model to generate a response that includes a set of alphanumeric elements from the at least one alphanumeric component, the set of alphanumeric elements satisfying the at least one signal extraction rule of the target signal domain group. The method can include predicting, using the determined set of alphanumeric elements, a set of sentiment attributes corresponding to the at least one alphanumeric component of the converted transcript. The method can include estimating, via comparison of the set of alphanumeric elements and the set of sentiment attributes to the at least one signal processing criterion, a signal performance score of the at least one authorized provider.

In some implementations, the set of sentiment attributes corresponding to the at least one alphanumeric component comprises a tone, a keyword, a user satisfaction level, a descriptive emotion, an expression of satisfaction, a sentiment analysis graph, or a combination thereof.

In some implementations, the set of identifiable user features from the user service profile comprise a phone number, an account number, a policy number, a set of prior service interactions, a user context data corresponding to the at least one subscribing user, or a combination thereof.

In some implementations, the method can include generating, from the user service profile of the at least one subscribing user, at least one reference sample comprising a prior alphanumeric component and an assigned signal domain group and modifying a request context of the prompt of the generative machine learning model for assigning the at least one alphanumeric component of the converted transcript to the target signal domain group to comprise the at least one reference sample.

In some implementations, the method can include, responsive to the estimated signal performance score exceeding an incompatibility threshold, generating at least one reference sample comprising a prior set of alphanumeric elements, a prior set of sentiment attributes, and an assigned signal domain group. The method can include prompting, using the at least one reference sample, the generative machine learning model to generate a response comprising a recommended signal domain group for the at least one alphanumeric component and displaying, at a user interface, a real-time notification alert comprising the recommended signal domain group.

In some implementations, the at least one reference sample is generated using data from a remote database, a dynamic look-up table, a response of the generative machine learning model, a retrieval augmented generation (RAG) process, or a combination thereof.

In some implementations, the method can include determining, using audio signal data of the recorded interaction, an encoding format that corresponds to at least one of a real-time audio stream, a stored audio file, or an existing transcript of the audio signal data. The method can include determining, using the encoding format, a set of audio signal properties from a metadata component of the audio signal data. The method can include generating, using a machine learning model, an enhanced version of the audio signal data that exceeds an audio quality threshold, wherein the enhanced version of the audio signal data comprises at least one modified audio signal property from the set of audio signal properties.

In some implementations, the set of audio signal properties comprise a file format, a bit rate, a sample rate, a number of audio channels, a signal duration, a silence duration, a codec, a gain of frequencies, a compression level, or a combination thereof.

In some implementations, the target signal domain group comprises an introduction for the at least one authorized provider, a statement of confidence for the at least one subscribing user, a variable reading error, a transaction, a contextual complaint report, a vulnerability, a promotion, or a combination thereof.

In some implementations, the set of alphanumeric elements comprises an account identifier, a debt amount, an address, a variable usage amount, a substantial charge, a contextual exception phrase, a vulnerability, an identity of the at least one subscribing user, an action performed by the at least one authorized provider, a focus topic of the recorded interaction, or a combination thereof.

In some implementations, the method can include displaying, at a user interface, a custom interface component enabling an authorized user to modify a set of configurable interface elements, wherein the set of configurable interface elements comprises (1) a first user configurable element associated with the signal performance score and (2) a second user configurable element associated with the set of alphanumeric elements.

In some implementations, the method can include accessing a signal certification map comprising an association of signal performance score thresholds to at least one signal certification category. The method can include determining, from the signal certification map, at least one signal performance score threshold corresponding to an estimated signal performance score. The method can include, when the estimated signal performance score exceeds the at least one signal performance score threshold, displaying a signal certification category associated with the at least one signal performance score at the custom interface component of the user interface.

In some implementations, the method can include receiving, from the user interface, a validation signal from the authorized user verifying the estimated signal performance score; obtaining a set of prior signal performance scores corresponding to prior recorded interactions involving at least one of: the at least one authorized provider of the enterprise service, or the at least one subscribing user of the enterprise service; using the set of prior signal performance scores and the estimated signal performance score, generating an aggregate performance score; and displaying, at the user interface, a notification comprising at least one recommendation for improving the aggregate performance score.

In some implementations, the method can include receiving, from the user interface, a user correction of contents for at least one user configurable element from the set of configurable interface elements, wherein the user correction comprises (1) an initial outcome predicted via the generative machine learning model and (2) a corresponding calibration outcome inputted by the authorized user; and updating the generative machine learning model using the initial outcome and the corresponding calibration outcome.

In some implementations, the custom interface component further comprises an interactable audio component that, when selected by the authorized user, facilitates playback of at least a portion of the audio signal data corresponding to the set of alphanumeric elements.

In some implementations, the method can include determining, using the audio signal data and the converted transcript, at least one participant of the recorded interaction corresponding to the at least one alphanumeric component; and displaying, at the user interface, a visual interface component comprising the set of alphanumeric elements of the at least one alphanumeric component, wherein the visual interface component comprises (1) an alphanumeric identifier corresponding to the at least one participant and (2) a visual marking of the at least one alphanumeric component that corresponds to at least one sentiment attribute from the set of sentiment attributes.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms.

Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method performed by a signal processing system, the method comprising:
    receiving audio signal data corresponding to a recorded interaction involving at least one authorized provider of an enterprise service and at least one subscribing user of the enterprise service,
        wherein the at least one subscribing user of the enterprise service is associated with a user service profile;
    converting, using a machine learning model, the audio signal data into a transcript comprising alphanumeric components;
    prompting a generative machine learning model to generate a response that maps at least one alphanumeric component of the converted transcript to a target signal domain group,
        wherein configuration of the prompt for the generative machine learning model comprises a set of identifiable user features from the user service profile, and
        wherein the target signal domain group comprises:
            at least one signal extraction rule for determining target alphanumeric elements within alphanumeric components of the converted transcript, and
            at least one signal processing criterion for evaluating performance scores associated with the at least one authorized provider;
    prompting the generative machine learning model to generate a response that includes a set of alphanumeric elements from the at least one alphanumeric component, the set of alphanumeric elements satisfying the at least one signal extraction rule of the target signal domain group;
    predicting, using the determined set of alphanumeric elements, a set of sentiment attributes corresponding to the at least one alphanumeric component of the converted transcript;
    estimating, via comparison of the set of alphanumeric elements and the set of sentiment attributes to the at least one signal processing criterion, a signal performance score of the at least one authorized provider; and
    displaying, at a user interface, a custom interface component enabling an authorized user to modify a set of configurable interface elements,
        wherein the set of configurable interface elements comprises (1) a first user configurable element associated with the signal performance score and (2) a second user configurable element associated with the set of alphanumeric elements.

2. The method of claim 1 performed by the signal processing system, wherein the set of sentiment attributes corresponding to the at least one alphanumeric component comprises a tone, a keyword, a user satisfaction level, a descriptive emotion, an expression of satisfaction, a sentiment analysis graph, or a combination thereof.

3. The method of claim 1 performed by the signal processing system, wherein the set of identifiable user features from the user service profile comprise a phone number, an account number, a policy number, a set of prior service interactions, a user context data corresponding to the at least one subscribing user, or a combination thereof.

4. The method of claim 1 performed by the signal processing system, the method further comprising:
generating, from the user service profile of the at least one subscribing user, at least one reference sample comprising a prior alphanumeric component and an assigned signal domain group; and
modifying a request context of the prompt of the generative machine learning model for assigning the at least one alphanumeric component of the converted transcript to the target signal domain group to comprise the at least one reference sample.

5. The method of claim 1 performed by the signal processing system, the method further comprising:
responsive to the estimated signal performance score exceeding an incompatibility threshold, generating at least one reference sample comprising a prior set of alphanumeric elements, a prior set of sentiment attributes, and an assigned signal domain group;
prompting, using the at least one reference sample, the generative machine learning model to generate a response comprising a recommended signal domain group for the at least one alphanumeric component; and
displaying, at a user interface, a real-time notification alert comprising the recommended signal domain group.

6. The method of claim 5 performed by the signal processing system, wherein the at least one reference sample is generated using data from a remote database, a dynamic look-up table, a response of the generative machine learning model, a retrieval augmented generation (RAG) process, or a combination thereof.

7. The method of claim 1 performed by the signal processing system, the method further comprising:
determining, using audio signal data of the recorded interaction, an encoding format that corresponds to at least one of: a real-time audio stream, a stored audio file, or an existing transcript of the audio signal data;
determining, using the encoding format, a set of audio signal properties from a metadata component of the audio signal data; and
generating, using a machine learning model, an enhanced version of the audio signal data that exceeds an audio quality threshold,
wherein the enhanced version of the audio signal data comprises at least one modified audio signal property from the set of audio signal properties.

8. The method of claim 7 performed by the signal processing system, wherein the set of audio signal properties comprise a file format, a bit rate, a sample rate, a number of audio channels, a signal duration, a silence duration, a codec, a gain of frequencies, a compression level, or a combination thereof.

9. The method of claim 1 performed by the signal processing system, wherein the target signal domain group comprises an introduction for the at least one authorized provider, a statement of confidence for the at least one subscribing user, a variable reading error, a transaction, a contextual complaint report, a vulnerability, a promotion, or a combination thereof.

10. The method of claim 1 performed by the signal processing system, wherein the set of alphanumeric elements comprises an account identifier, a debt amount, an address, a variable usage amount, a substantial charge, a contextual exception phrase, a vulnerability, an identity of the at least one subscribing user, an action performed by the at least one authorized provider, a focus topic of the recorded interaction, or a combination thereof.

11. The method of claim 1 performed by the signal processing system, the method further comprising:
accessing a signal certification map comprising an association of signal performance score thresholds to at least one signal certification category;
determining, from the signal certification map, at least one signal performance score threshold corresponding to an estimated signal performance score; and
when the estimated signal performance score exceeds the at least one signal performance score threshold, displaying a signal certification category associated with the at least one signal performance score at the custom interface component of the user interface.

12. The method of claim 1 performed by the signal processing system, the method further comprising:
receiving, from the user interface, a validation signal from the authorized user verifying the estimated signal performance score;
obtaining a set of prior signal performance scores corresponding to prior recorded interactions involving at least one of: the at least one authorized provider of the enterprise service, or the at least one subscribing user of the enterprise service;
using the set of prior signal performance scores and the estimated signal performance score, generating an aggregate performance score; and
displaying, at the user interface, a notification comprising at least one recommendation for improving the aggregate performance score.

13. The method of claim 1 performed by the signal processing system, the method further comprising:
receiving, from the user interface, a user correction of contents for at least one user configurable element from the set of configurable interface elements,
wherein the user correction comprises (1) an initial outcome predicted via the generative machine learning model and (2) a corresponding calibration outcome inputted by the authorized user; and
updating the generative machine learning model using the initial outcome and the corresponding calibration outcome.

14. The method of claim 1 performed by the signal processing system, wherein the custom interface component further comprises an interactable audio component that, when selected by the authorized user, facilitates playback of at least a portion of the audio signal data corresponding to the set of alphanumeric elements.

15. The method of claim 1 performed by the signal processing system, the method further comprising:
determining, using the audio signal data and the converted transcript, at least one participant of the recorded interaction corresponding to the at least one alphanumeric component; and
displaying, at the user interface, a visual interface component comprising the set of alphanumeric elements of the at least one alphanumeric component,
wherein the visual interface component comprises (1) an alphanumeric identifier corresponding to the at least one participant and (2) a visual marking of the at least one alphanumeric component that corresponds to at least one sentiment attribute from the set of sentiment attributes.

16. A non-transitory, computer-readable storage medium comprising instructions recorded thereon, wherein the instructions when executed by at least one data processor of a signal processing system, cause the system to:
receive audio signal data corresponding to a recorded interaction involving at least one authorized provider of an enterprise service and at least one subscribing user of the enterprise service,
wherein the at least one subscribing user of the enterprise service is associated with a user service profile;
convert, using a machine learning model, the audio signal data into a transcript comprising alphanumeric components;
prompt a generative machine learning model to generate a response that maps at least one alphanumeric component of the converted transcript to a target signal domain group,
wherein configuration of the prompt for the generative machine learning model comprises a set of identifiable user features from the user service profile, and
wherein the target signal domain group comprises:
at least one signal extraction rule for determining target alphanumeric elements within alphanumeric components of the converted transcript, and
at least one signal processing criterion for evaluating performance scores associated with the at least one authorized provider;
prompt the generative machine learning model to generate a response that includes a set of alphanumeric elements from the at least one alphanumeric component, the set of alphanumeric elements satisfying the at least one signal extraction rule of the target signal domain group;
predict, using the determined set of alphanumeric elements, a set of sentiment attributes corresponding to the at least one alphanumeric component of the converted transcript; and
estimate, via comparison of the set of alphanumeric elements and the set of sentiment attributes to the at least one signal processing criterion, a signal performance score of the at least one authorized provider.

17. The non-transitory, computer-readable storage medium of claim 16, wherein the signal processing system is further caused to:
generate, from the user service profile of the at least one subscribing user, at least one reference sample comprising a prior alphanumeric component and an assigned signal domain group; and
modify a request context of the prompt of the generative machine learning model for assigning the at least one alphanumeric component of the converted transcript to the target signal domain group to comprise the at least one reference sample.

18. The non-transitory, computer-readable storage medium of claim 16, wherein the signal processing system is further caused to:
responsive to the estimated signal performance score exceeding an incompatibility threshold, generate at least one reference sample comprising a prior set of alphanumeric elements, a prior set of sentiment attributes, and an assigned signal domain group;
prompt, using the at least one reference sample, the generative machine learning model to generate a response comprising a recommended signal domain group for the at least one alphanumeric component; and
display, at a user interface, a real-time notification alert comprising the recommended signal domain group.

19. The non-transitory, computer-readable storage medium of claim 16, wherein the signal processing system is further caused to:
display, at a user interface, a custom interface component enabling an authorized user to modify a set of configurable interface elements,
wherein the set of configurable interface elements comprises (1) a first user configurable element associated with the signal performance score and (2) a second user configurable element associated with the set of alphanumeric elements.

20. A signal processing system comprising:
at least one hardware processor; and
at least one non-transitory memory storing instructions, which, when executed by the at least one hardware processor, cause the signal processing system to:
receive audio signal data corresponding to a recorded interaction involving at least one service provider and at least one subscribing user,
wherein the at least one subscribing user is associated with a user service profile;
convert, using a machine learning model, the audio signal data into a transcript comprising alphanumeric components;
prompt a generative machine learning model to generate a response that maps at least one alphanumeric component of the converted transcript to a target signal domain group,
wherein configuration of the prompt for the generative machine learning model comprises a set of identifiable user features from the user service profile, and
wherein the target signal domain group comprises:
at least one signal extraction rule for determining target alphanumeric elements within alphanumeric components of the converted transcript, and
at least one signal processing criterion for evaluating performance scores associated with the at least one service provider;
prompt the generative machine learning model to generate a response that includes a set of alphanumeric elements from the at least one alphanumeric component, the set of alphanumeric elements satisfying the at least one signal extraction rule of the target signal domain group;
predict, using the determined set of alphanumeric elements, a set of sentiment attributes corresponding to the at least one alphanumeric component of the converted transcript; and
estimate, via comparison of the set of alphanumeric elements and the set of sentiment attributes to the at least one signal processing criterion, a signal performance score of the at least one service provider.

* * * * *